W. H. LEE.
HARROW.
APPLICATION FILED JAN. 19, 1916.
1,244,993.
Patented Oct. 30, 1917.
Fig. 1.
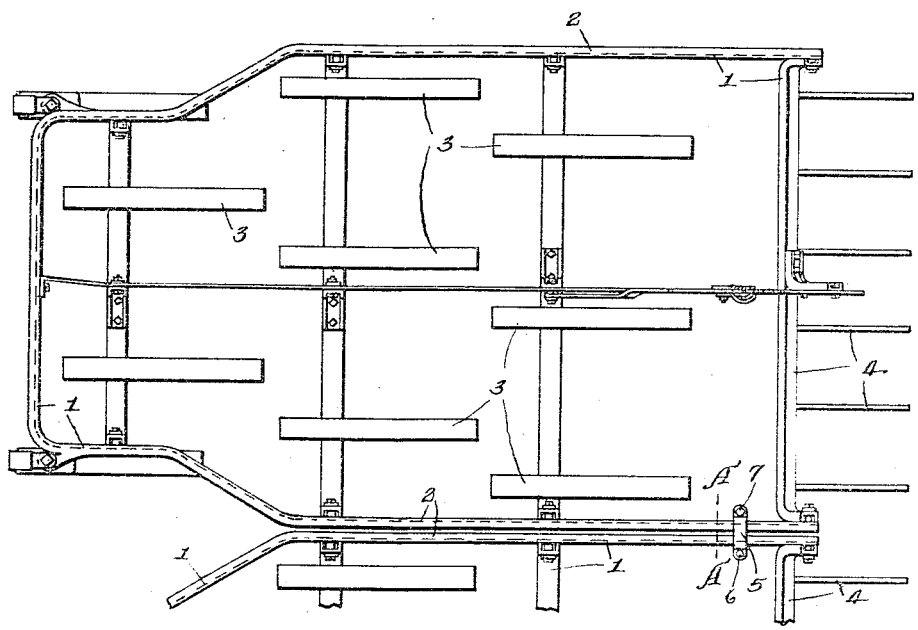
Fig. 2.
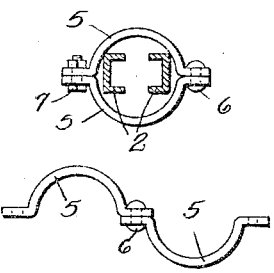
Fig. 3.
INVENTOR
William H. Lee
BY
Parsons & Bodell
ATTORNEYS

UNITED STATES PATENT OFFICE.

WILLIAM H. LEE, OF SYRACUSE, NEW YORK, ASSIGNOR TO SYRACUSE CHILLED PLOW COMPANY, OF SYRACUSE, NEW YORK, A CORPORATION OF NEW YORK.

HARROW.

1,244,993.  Specification of Letters Patent.  Patented Oct. 30, 1917.

Application filed January 19, 1916. Serial No. 72,980.

*To all whom it may concern:*

Be it known that I, WILLIAM H. LEE, a citizen of the United States, residing at Syracuse, in the county of Onondaga and State of New York, have invented a certain new and useful Harrow, of which the following is a specification.

This invention relates to agricultural implements and particularly to harrows, and has for its object an especially simple and efficient means for flexibly coupling the frames of harrows arranged side by side whereby the frames may have relative movement in all directions; and the invention consists in the novel combinations and constructions hereinafter set forth and claimed.

In describing this invention reference is had to the accompanying drawings in which like characters designate corresponding parts in all the views.

Figure 1 is a plan view of a gang of harrows embodying my invention, one of the harrows being broken away.

Fig. 2 is an enlarged sectional view on line A—A, Fig. 1.

Fig. 3 is a detail view of the ring coupling the harrow frames together, the ring being shown as open.

This invention comprises, generally, means for flexibly coupling the harrow frames of a gang of harrows together, whereby the frames are capable of relative movement forwardly and rearwardly, laterally and also vertically, during the movement of the gang over the ground and during the turning thereof at a corner. Although I have shown my invention as embodied in harrows, it is not necessarily limited to harrows but may be applied to other forms of agricultural implements.

1 designates the frames of the harrows which frames include members or bars 2 running forwardly and rearwardly of the harrows and arranged side by side.

3 designates the spring teeth of the harrows, and 4, the rakes at the rear ends of the harrows.

The means for flexibly coupling the harrow frames 1 together to permit movement thereof in all directions, that is, forwardly, rearwardly, laterally and vertically, coacts with the members 2 of the frames and comprises an element as a ring 5 coupling the members 2 of both frames and preferably slidable lengthwise of said members 2 of both frames.

As here shown, the ring 5 loosely fits the bars 2, so that the harrow frames 1 have a movement relatively to each other. Said ring 5 extends around or encircles both members 2. Said ring 5 is here shown as formed of upper and lower sections, which are pivoted together at 6, and detachably secured together at a point diametrically opposite the pivot 6 by means of a bolt and nut 7. A ring so constructed can be readily applied or removed.

In operation the draft is applied to the front ends of all the harrow frames in the gang as will be understood by those skilled in the art; and during the movement of the harrows over the ground or when turning corners, the coupling means between the harrow frames permits a freedom of movement which facilitates the movement of the harrows.

In so far as applicant is aware, he is the first to provide a harrow frame coupling in which the frames are capable of relative movement in all directions.

What I claim is:

1. The combination of agricultural implements comprising frames having members extending forwardly and rearwardly thereof side by side, and coupling means joining said members and slidably engaging both of said members, substantially as and for the purpose described.

2. The combination of agricultural implements comprising frames having members extending side by side lengthwise thereof, a ring slidably and loosely coupling said members together and extending around both of said members, substantially as and for the purpose specified.

In testimony whereof, I have hereunto signed my name at Syracuse, in the county of Onondaga, in the State of New York, this 23rd day of December, 1915.

WILLIAM H. LEE.

Copies of this patent may be obtained for five cents each, by addressing the "Commissioner of Patents, Washington, D. C."